United States Patent
Macor

[11] Patent Number: 5,901,222
[45] Date of Patent: * May 4, 1999

[54] USER INTERFACE FOR PORTABLE TELECOMMUNICATION DEVICES

[75] Inventor: James Joseph Macor, Jackson, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/739,670

[22] Filed: Oct. 31, 1996

[51] Int. Cl.$^6$ .............. H04M 1/56; H04M 1/00; H04M 9/00
[52] U.S. Cl. ............ 379/433; 379/428; 379/434; 379/419; 379/142; 379/93.17; 455/90
[58] Field of Search ............ 379/433, 419, 379/428, 434, 355, 354, 93.17, 93.23, 142; 455/90

[56] References Cited

U.S. PATENT DOCUMENTS

| | | | |
|---|---|---|---|
| D. 355,611 | 2/1995 | Hanagata | D10/31 |
| 5,054,051 | 10/1991 | Hoff | 379/56 |
| 5,422,656 | 6/1995 | Allard et al. | 345/173 |
| 5,436,954 | 7/1995 | Nishiyama et al. | 379/58 |

FOREIGN PATENT DOCUMENTS 4111655  4/1992  Japan.

Primary Examiner—Harry S. Hong
Assistant Examiner—Benny Q. Tieu
Attorney, Agent, or Firm—Claude R. Narcisse

[57] ABSTRACT

An ergonomic portable telecommunication device that can be completely operated with a depressable trackball.

13 Claims, 7 Drawing Sheets

USER INTERFACE FOR PORTABLE TELECOMMUNICATION DEVICES

CROSS REFERENCES

This application is related to a commonly assigned application entitled "Telephone with Minimal Switches for Dialing" filed on Dec. 12, 1994 with Ser. No. 08/362054 and a commonly assigned and concurrently filed application entitled "User Interface for Personal Telecommunication Devices" filed on Oct. 31, 1996 with Ser. No. 08/739668.

BACKGROUND OF THE INVENTION

1. Field of the Invention

This invention relates to portable telecommunication devices and in particular to the physical design of such devices.

2. Description of Related Art

As telephones and other telecommunication devices have become more portable, there has arisen a design conflict between the physical size for these devices and the trend for smaller devices due to the advances in integrated circuit technology. From an ergonomic viewpoint, it is only practical to reduce the size of these devices including the size of the traditional twelve button dialing keypad typically found on these devices and other functional interface buttons to a size that still allows for speedy, effective and accurate use of these devices. From a technological viewpoint, however, as integrated circuitry and other electronic components are continually decreasing in physical size, these portable communication devices can be designed and manufactured at relatively very small sizes. The technology has reached a point where it is no longer ergonomically desirable to continue to decrease the size of the personal telecommunication devices because it becomes difficult and almost impossible for users to operate these devices. For example, the dialing keypad buttons become so small that it becomes difficult for a user to touch one key without accidentally touching another key or the entire device becomes so small that it becomes difficult for a user to use the device as a telephone because the distance between the device's microphone and speaker is not sufficiently long to extend from the user's ear to the user's mouth.

SUMMARY OF THE INVENTION

This invention overcomes the heretofore discussed limitations by providing an ergonomic user interface for a portable telecommunication device comprising a base member having an inner surface, an outer surface and two ends. A display is mounted on the inner surface of the base member for displaying information. The base member also supports a speaker and a microphone. The base member further supports a manipulatable member which is functionally connected to the display so that the displayed information changes when the manipulatable member is manipulated. The manipulatable member and the display are located between the speaker and the microphone.

DETAILED DESCRIPTION

Figure 1:
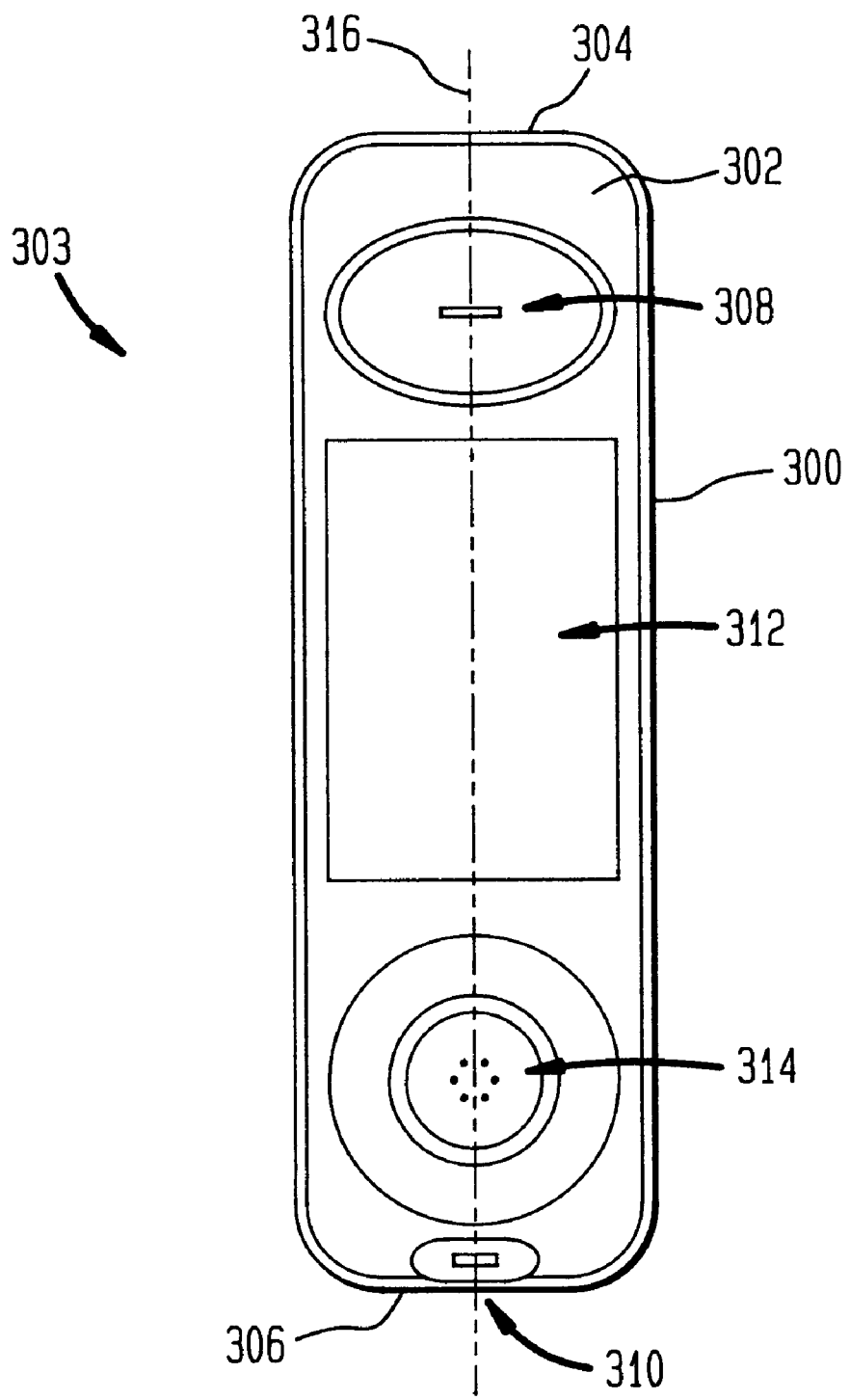
FIG. 1 depicts the present invention.
Figure 13:
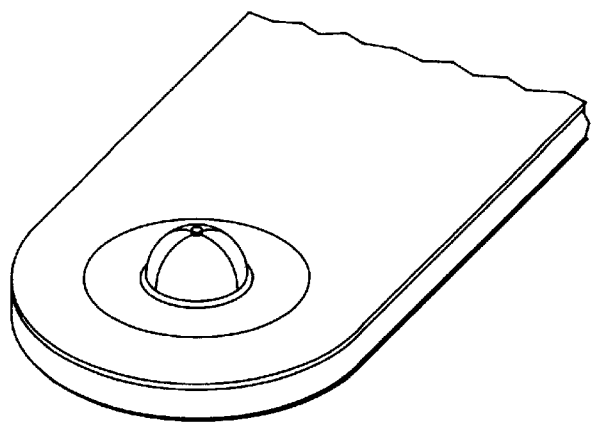
FIG. 13 depicts an ergonomic joystick supported by the base member of the present invention.

FIG. 1 depicts the present invention as portable telecommunication device. Device 303 comprises base member 300 having an inner surface 302, first end 304 and second end 306. Base member 300 supports speaker 308 positioned substantially near first end 304. Base member 300 also supports microphone 310 positioned substantially near second 306. Display 312 is mounted on inner surface 302 of base member 300 and displays information. Manipulatable member 314 functionally connected to display 312 is also supported by base member 300. A manipulation of manipulatable member 314 causes information displayed on information display 312 to change. Speaker 308, display 312, manipulatable member 314 and microphone 310 are linearly arranged along longitudinal axis 311. Manipulatable member 314 is shown as a trackball that can be depressed to alter information being displayed on display 312. Manipulatable member 314 can be a joystick that is easily manipulated with one finger by the user and retracts to a center position when released by the user. As with the depressable trackball, the joystick can be depressed to alter information being displayed on the display. Another type of manipulatable member is shown in FIG. 13. FIG. 13 depicts ergonomic joystick 315 having dome member member 316 and friction bump 318 to facilitate manipulation by the user. Ergonomic joystick is easily manipulated by a user to alter information being displayed on display 312 and retracts to a center position when released by the user. Friction bump 318 allows easy manipulation of this ergonomic joystick as it substantially eliminates the need by the user to use more than one finger to operate ergonomic joystick 315. Also, dome member 316 provides a reactive force to the user's finger forcing the user to apply the proper force when manipulating ergonomic joystick 315. As with the depressable trackball, ergonomic joystick 315 is depressable and thus is used to alter information being displayed on display 312. Any manipulatable member such as those described above or others that allow a user to completely operate the device (including turning the device ON and OFF) can be used as part of the interface claimed in this invention. Ergonomic joystick 315, display 312, microphone 310 and speaker 308 have appropriate sizes in that any further decrease in their sizes would make it difficult for a user to operate the device. Ergonomic joystick 315 and manipulatable member 314 are functionally connected to display 312 with microprocessor means and electronic means (not shown) for controlling and changing symbols on a display.

Figure 2:
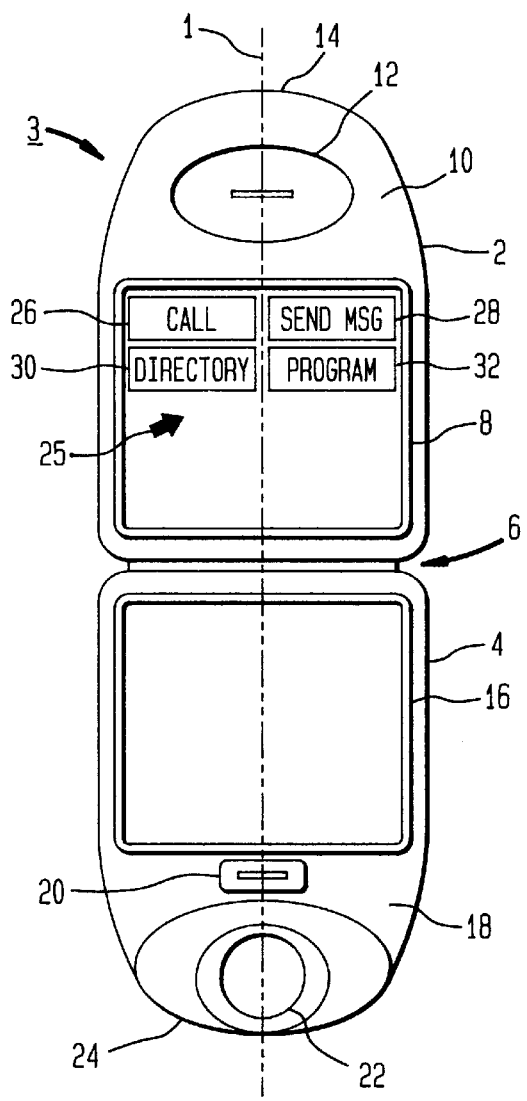
FIG. 2 depicts the present invention as a hinged device with an information display and a function display.

FIG. 2 shows device 3 (hereinafter "the hinged device"), the second embodiment of the present invention which has a function display 8 mounted on inner surface 10 of first base member 2 for displaying data menus and function keys. Information display 16 is mounted on inner surface 18 of second base member 4 which is hingedly connected to first base member 2 with hinge 6. That is, hinge 6 is connected to first base member 2 at first hinged end 13 and to base member 4 at second hinged end 15. Manipulatable member 22 is supported by second base member 4 and allows the user to completely operate device 3 by formulating information from the display menu and activating the function keys to cause said information to be displayed on information display 16. Microphone 20 is supported by base member 4. Speaker 12 is supported by base member 2 and positioned substantially near end 14 of first base member 2. The manipulatable member is depressable trackball 22 which is positioned substantially near end 24 of second base member 4. Depressable trackball 22 maneuvers location indicator 25 displayed on function display 8 and when depressed allows the user to activate a selected function key or button being displayed on the function display. When base members 2 and 4 are oriented so that they are coplanar, as shown in FIG. 2, the distance between first end 14 and second end 24 a function of the arrangement and individual sizes of speaker 12, function display 8, information display 16, microphone 20 and depressable trackball 22. Longitudinal axis 1 extends from end 14 to end 24. Speaker 12, function display 8, information display 16, microphone 20 and depressable trackball 22 are arranged linearly and symmetrically about longitudinal axis 1 thereby defining the distance between end 14 and end 24. Function display 8 and information display 16 have the smallest area that allows a user holding device 3 to discern the symbols, virtual buttons and virtual function keys being displayed. Depressable trackball 22 has the smallest size that allows a user to completely operate hinged device 3 with one finger. Speaker 12 and microphone 20 have the smallest size that allows a user to use hinged device 3 as a telephone, i.e., a user holding device 3 to be able to speak into microphone 20 and listen with speaker 12. Function display 8, information display 16, speaker 12, microphone 20 and depressable trackball 22 have appropriate sizes in that any further decrease in their sizes would make device 3 difficult to use and operate.

Hinged device 3 operates in various modes which are shown on function display 8. Function display 8 displays virtual function key 26 which allows the user to enter the "call" mode. Virtual function key 28 allows the user to enter the "electronic message" mode. Virtual function key 30 allows the user to enter the "directory" mode. Virtual function key 32 allows the user to enter the "program mode."

Figure 3:
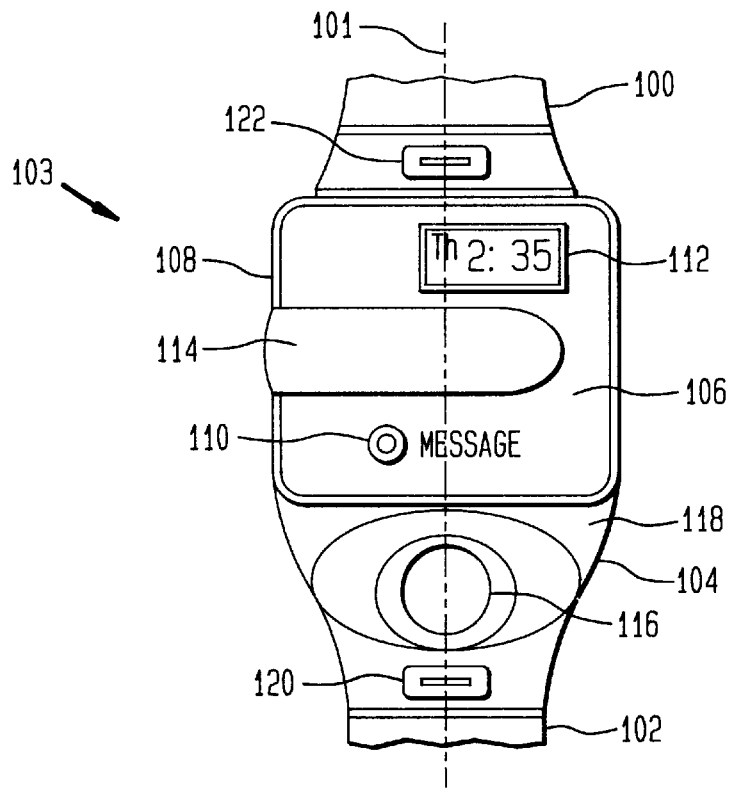
FIG. 3 depicts the present invention as a wearable device with information display door closed.
Figure 4:
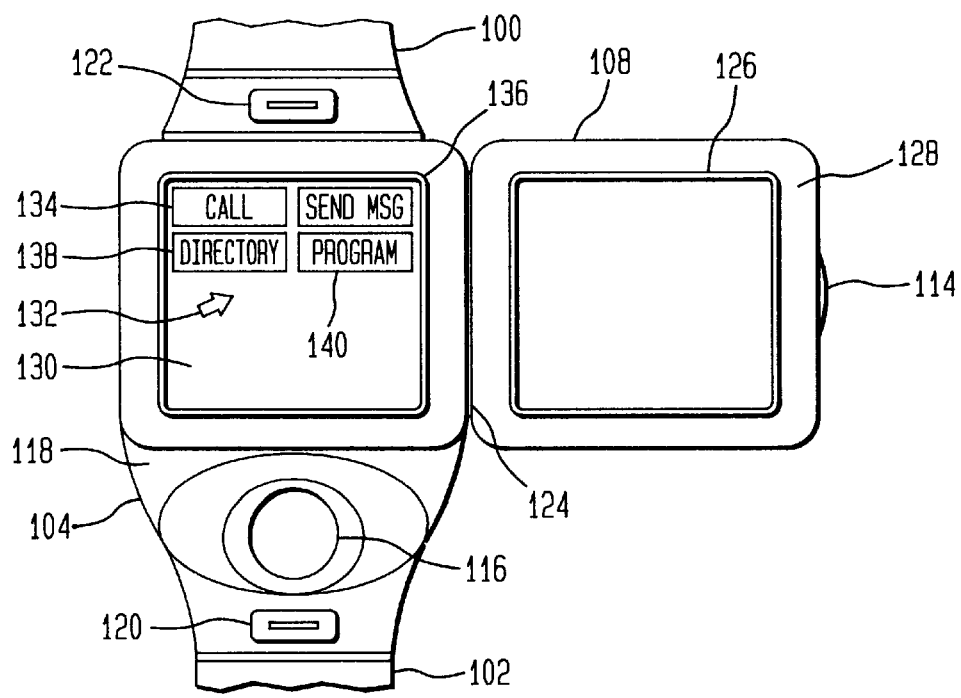
FIG. 4 depicts the wearable device having a function display with information display door opened.

FIG. 3 depicts device 103, the third embodiment of the present invention (hereinafter "the wearable device") which shows appendages 100 and 102 connected to respective opposite ends 119 and 121 of base member 104. Appendages 100 and 102 are attachment means for affixing device 103 to a user. Attached to the back surface 106 of door 108 are incoming message indicator 110, display 112 and finger catch 114. Finger catch 114 allows the user to open and close door 108 and detachably connects door 108 to base member 104. The wearable device can be used as a wristwatch where display 112 displays the time and date. The manipulatable member is depressable trackball 116 supported by inner surface 118 of base member 104. Microphone 120 is mounted on appendage 102. Speaker 122 is mounted on appendage 100. Speaker 122 and microphone 120 can also be mounted onto base member 104. FIG. 4 depicts the device when the user opens door 108 with the use of finger catch 114. Door 108 is hingedly connected to base member 104 with hinge 124. Information Display 126 is mounted front surface 128 of door 108. Function display 130 is mounted to inner surface 118 of base member 104. Depressable trackball 116 maneuvers location indicator 132 displayed on function display 130 and can be depressed by the user to activate a function key or button being displayed on function display 130. Regarding the sizes of the elements of the wearable device 103, function display 130 and information display 126 have the smallest size that allows the user to discern the symbols, virtual keys and buttons appearing at both displays. Depressable trackball 116 has the smallest size that allows the user to completely operate the device with one finger. Speaker 122 and microphone 120 have sizes that are limited by the size of appendages 100 and 102.

Function display 130 displays virtual function key 134 which allows the user to enter the "call" mode. Virtual function key 136 allows the user to enter the "electronic message" mode. Virtual function key 138 allows the user to enter the "directory mode" and virtual function key 140 allows the user to enter the "program" mode. Portable device 3 and wearable device 103 operate in these various modes which are discussed below.

Figure 5:
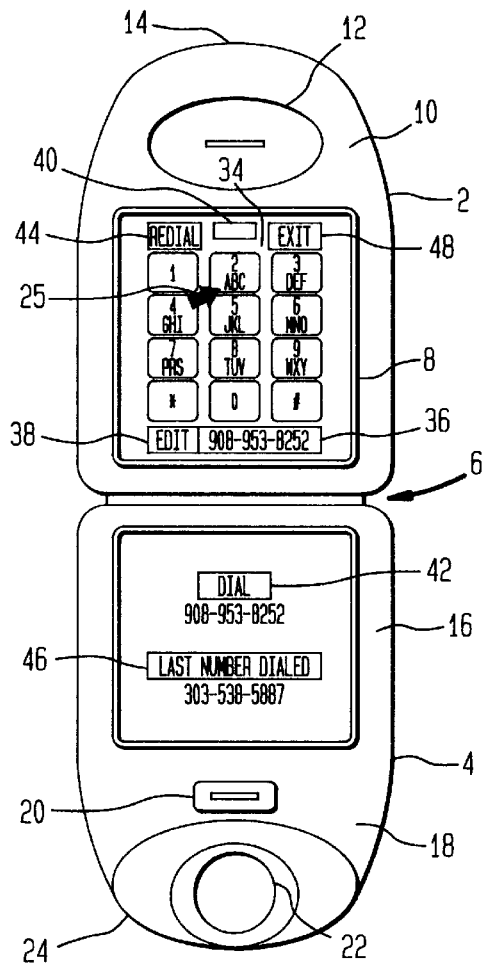
FIG. 5 depicts the hinged device in the "call" mode.
Figure 6:
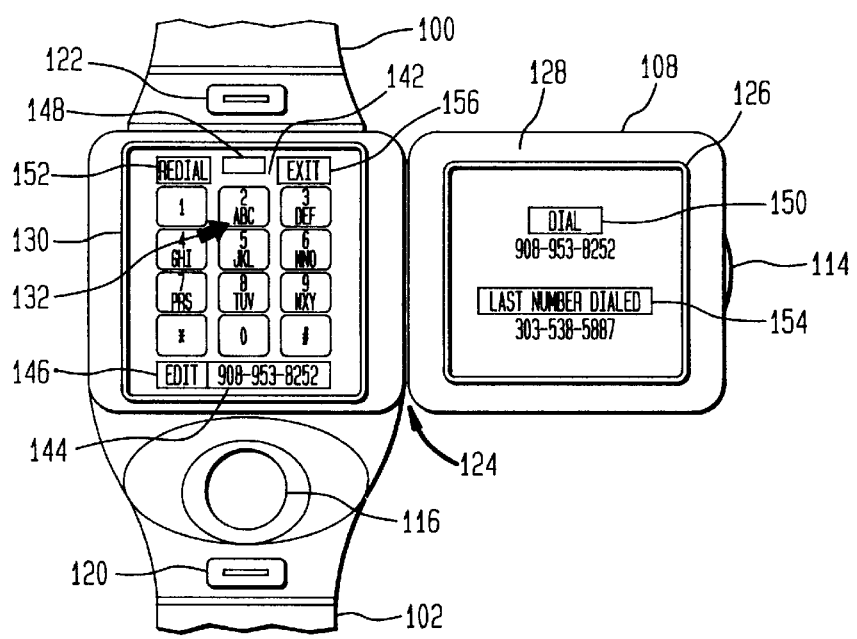
FIG. 6 depicts the wearable device in the "call" mode.

Referring to FIGS. 2 and 4, to enter into the Call mode for portable device 3 (and wearable device 103), the user maneuvers depressable trackball 22 (116) so that location indicator 25 (132) points directly at virtual call function key 26 (134). Depressable trackball 22 (116) is functionally connected to function display 8 (130) and information display 16 (126) with microprocessor means and electronic circuit means (not shown) for controlling and changing symbols on a display. The microprocessor means and electronic circuit means for controlling and changing symbols on a display are well known to those of ordinary skill in the art to which this invention belongs and thus are not discussed herein. The user then depresses depressable trackball 22 (116) activating virtual call function key 26 (134). The devices enter into the call mode as shown in FIGS. 5 and 6. In the call mode, the user can operate a virtual keypad 34 (142) displayed at function display 8 (126) to make a call. In the example shown, the user maneuvers depressable trackball 22 (116) to point to a virtual button of keypad 34 (142) with location indicator 25 (132) and selects that number by depressing depressable trackball 22 (116). Each number selected by the user appears at display field 36 (144). The user can edit any number appearing at display field 36 (144) by first selecting virtual edit function key 38 (146) and then highlighting a number in display field 36 (144) that is to be edited. The next number selected from keypad 34 (142) replaces the highlighted number. The user selects edit function key 38 (146) by first pointing to it with location indicator 24 (132) and then depressing depressable trackball 22 (116). Each number appearing at field display 36 (144) is highlighted in the same manner, i.e., the user points to the number with location indicator 25 (132) and then highlights the number by depressing depressable trackball 22 (116). Once the user is ready to dial the number, the user selects dial function key 40 (148). The number being dialed then appears on information display 16 (126) underneath display field 42 (150). Redial key 44 (152) allows the user to redial the last number dialed which appears underneath display field 46 (154) of information display 16 (126). The user exits from the Call mode by selecting exit key 48 (156) which returns the devices to the idle mode as shown in FIGS. 2 and 4. Function display 8 (130) and information display 16 (126) are LCD displays.

Figure 7:
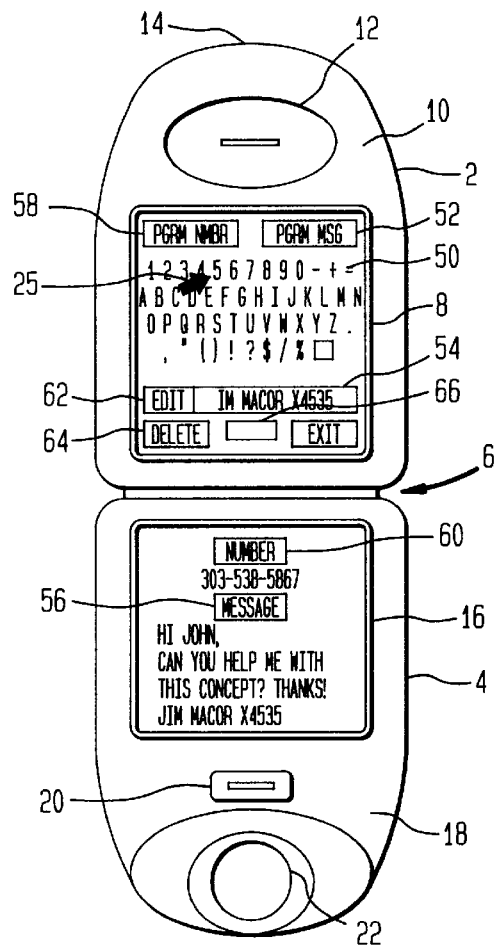
FIG. 7 depicts the hinged device in the "electronic message" mode.
Figure 8:
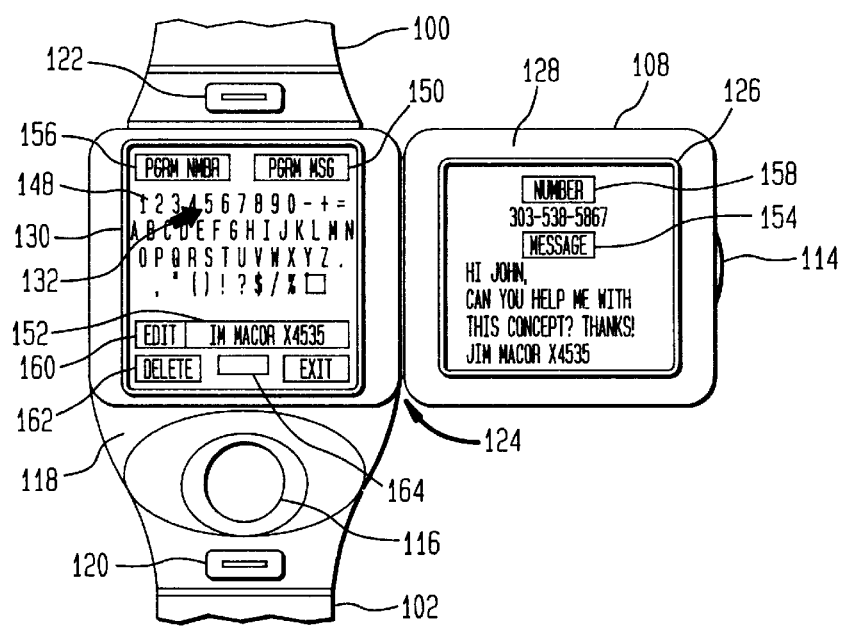
FIG. 8 depicts the wearable device in the "electronic message mode" mode.

Referring to FIGS. 2 and 4, to enter into the Electronic Message mode from the idle mode, the user activates Send Msg function key 28 (136). FIGS. 7 and 8 show the devices in the electronic message mode. The user formulates a message with the user of virtual keyboard 50 (148). Virtual keyboard 50 (148) may contain any type of symbol set where each virtual key represents at least one symbol. First, the user highlights Program Message key 52 (150) and then selects the proper alphanumeric keys from virtual keyboard 50 (148) to form a message. The message being formulated appears in edit display field 54 (152) and in information display 16 (126) underneath display field 56(154). The user then highlights Program Number key 58 (156) to enter the telephone number to which the message is being sent. The user formulates the phone number by selecting the pertinent numbers from virtual keyboard 50 (148). The formulated telephone number appears in edit display field 54(152) and in information display 16 (126) underneath display field 60(158). While entering the message or telephone number, the user can edit the entered information by first highlighting edit function key 62 (160) and then highlighting a character appearing in edit display field 54 (152). If the user wants to delete the highlighted character, the user simply activates delete function key 64 (162). If the user wants to insert a character, the user simply selects that character from keyboard 50 (148) causing the character to be inserted immediately after the highlighted character. The user can also scroll through the entered text message or telephone number to display that part of the message or telephone number that needs to be edited. The user does this by selecting edit function key 62 (160) and holding down depressable trackball 22 (116) causing the message or telephone number to scroll across edit display field 54 (152) and stops scrolling the message or phone number when the portion of text that needs to be edited is being displayed by edit display field 54 (152). The user stops the scrolling by simply releasing depressable trackball 22 (116). Once the user is satisfied with the accuracy of the message and telephone number, the user activates transmit function key 66 (164) causing the device to dial the displayed number and transmit the text displayed at information display 16 (126). The user exits from the Electronic Message mode by selecting exit key 47 (157) which returns the device to the idle mode as shown in FIGS. 2 and 4.

Figure 9:
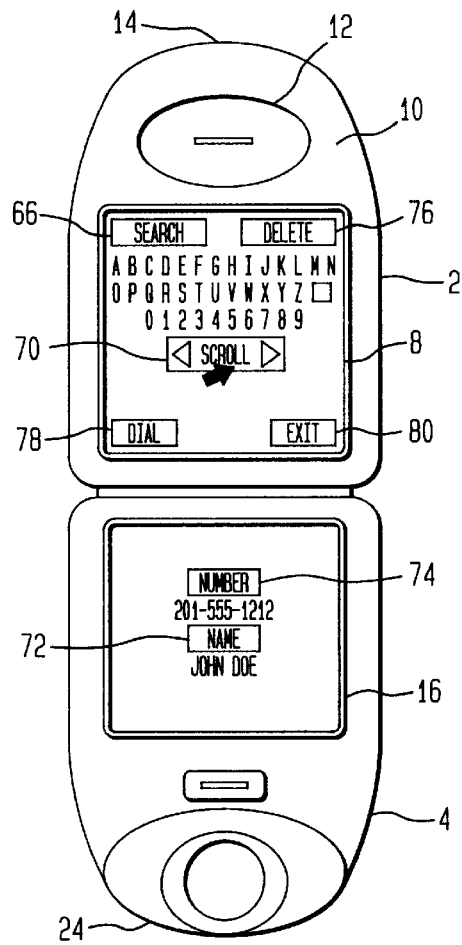
FIG. 9 depicts the hinged device in the "directory" mode.
Figure 10:
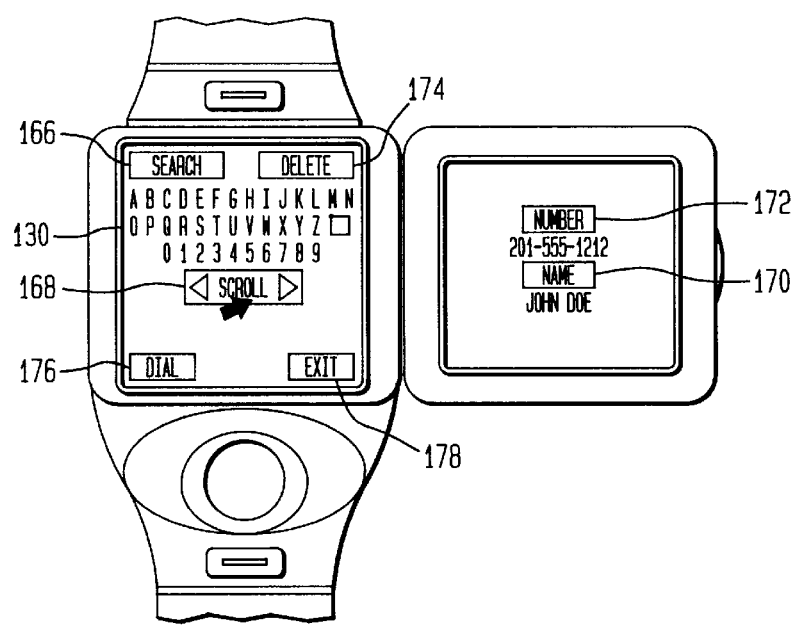
FIG. 10 depicts the wearable device in the "directory" mode.

Referring to FIGS. 2 and 4, to enter into the directory mode from the idle mode, the user activates directory function key 30 (138) causing the devices to appear as shown in FIGS. 9 and 10. The user can search for a stored name and accompanying telephone number by first activating search function key 66 (166) and then scroll forward or backward through the list by activating scroll key 70 (168 ) causing the stored names to appear underneath name display field 72 (170) and the telephone numbers to appear underneath number display 74 (172). The user can also search for a name by first activating search key 68 (166) and then entering the name by selecting the proper symbols from function display 8 (130) causing the name to appear underneath name display field 72 (170). If the name is stored, the accompanying telephone number is displayed underneath display field 74 (172) on information display 16 (126). The user can store a name and number by selecting the alphanumeric characters displayed on function display 8 (130). The user can delete a stored name and accompanying number by activating delete function key 76 (174) while the name and number are being displayed. The user can dial the displayed number by activating dial function key 78 (176). The user can exit from the directory mode and return to the idle mode by activating exit function key 80 (178).

Figure 11:
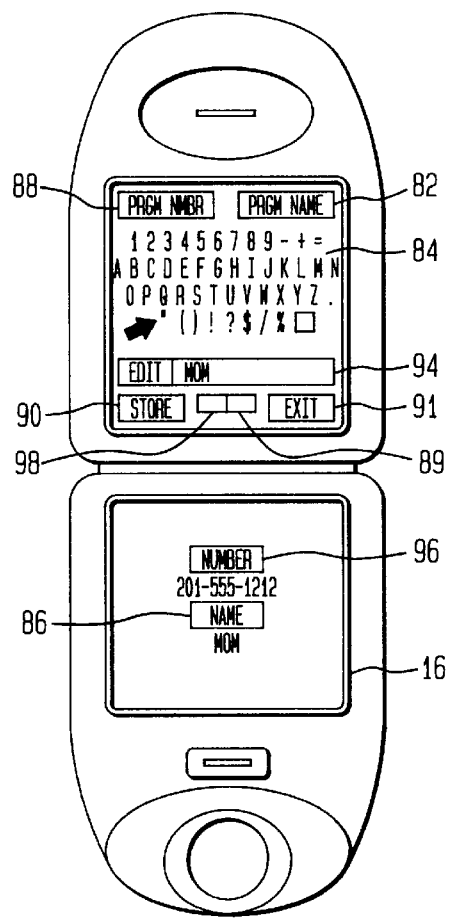
FIG. 11 depicts the hinged device in the "program" mode.
Figure 12:
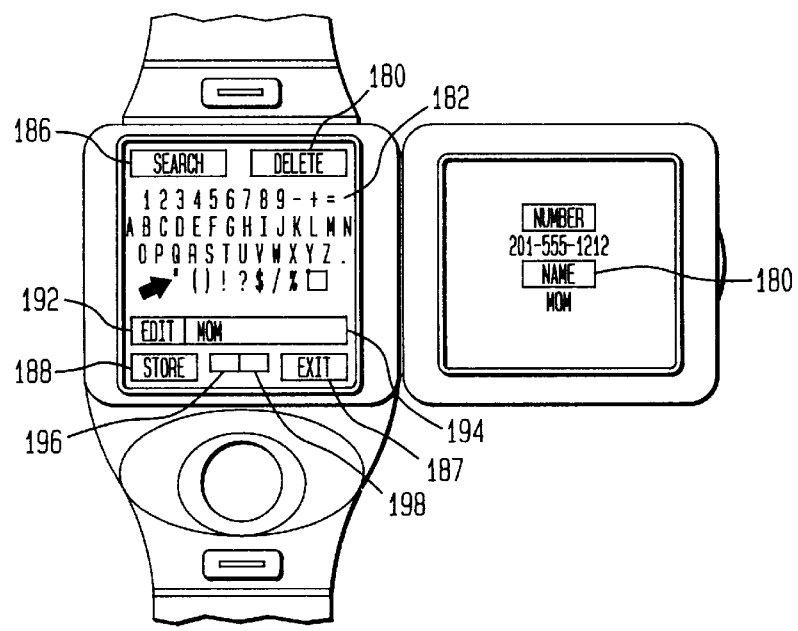
FIG. 12 depicts the wearable device in the "program" mode.

Referring to FIGS. 2 and 4, to enter the program mode from the idle mode, the user activates program function key 32 (140) causing the devices to appear as shown in FIGS. 11 and 12. The user can program a name and a corresponding number and then assign a program name to the stored information. For example, a user first activates Program Name key 82 (180) and then formulates a name from keyboard 84 (182) with the name appearing underneath name field display 86 (184) and within edit field display 94 (192). The user then programs a telephone number by activating Program Number function key 88 (186) and selecting the numbers from keyboard 84 (182). The selected telephone number appears underneath number field display 96 (194) and in edit field display 94 (192). The user then stores the name and telephone number by activating store function key 90 (188). The user can edit the stored name and telephone number by first activating edit function key 92 (190). The user then highlights the letter or number to be deleted within edit field display 94 (192) and then selects delete key 98 (196) causing the highlighted alphanumeric character to be deleted. To insert a character, the user highlights the character within edit field display 94 (192) after which the new character is to be inserted. The user then simply selects the new character from keyboard 84 (182) which appears immediately after the highlighted character in edit display field 94 (192) and appears underneath name display field 86 (184) or number display field 96 (194). The user can store the name of the program by activating PGM key 89 (198) and then enters the name of the program in edit field 94 (192) using keyboard 84 (192). The user can exit the program mode by activating exit key 91 (187). Referring to FIGS. 2 and 4, the name of the programs stored by the user can be displayed on function screen 8 (130) by the user activating program key 32 (140) and then activating PGM key 89 (198) shown in FIGS. 10 and 11. Each program name can be activated in the same manner as a function key and when is so activated will cause the device to dial the telephone number associated with the program. This feature is commonly referred to as a speed dial feature.

The user interface also includes means for alerting the user of an incoming telephone call or an incoming message. Such means for alerting the user is well known in the art to which this invention belongs. The interface may use vibrating means for alerting the user where the entire device (portable or wearable) vibrates. Another means for alerting the user may be a blinking light or LED (light emitting diode) attached to the outer surfaces 7 and 17 (not shown) of first base member and second base member 4 respectively of hinged device 3, the back surface of the door 108 of wearable device 103 such as LED 110 in FIG. 2 or to outer surface 111 (not shown) of wearable device 103 depicted in FIG. 3.

The user interface described above interacts with a telephony or electronic messaging device having signal transmission and reception means for communicating voice, data and other information. These devices also have memory means for storing information and microprocessor means for allowing the manipulatable member to select data from the display menus, activate function keys to create information on one of the displays and cause that information to be displayed on another display. The electronic circuit and microprocessor means that allow the manipulatable member to be functionally connected to the displays as described above or to operate the displays as well as the electronics associated with the transmission means, reception means and memory means are readily known by those of ordinary skill in the art to which this invention pertains and thus, are not discussed herein.

I claim:

1. An ergonomic user interface system for a portable telecommunication device comprising:

a base member having two ends, an inner surface and an outer surface;

a display mounted on the inner surface of the base member for displaying information;

a microphone supported by the base member;

a speaker supported by the base member; and a manipulatable member supported by the base member and functionally connected to the display to alter an appearance of the displayed information whereby the user completely operates the device with the manipulatable member by selectively activating virtual function keys displayed on the display.

2. The user interface of claim 1 wherein the speaker, the display, the microphone and the manipulatable member are arranged linearly along a longitudinal axis extending between the ends of the base member.

3. The user interface of claim 1 wherein data menus are displayed on the display.

4. The user interface of claim 1 wherein the display is an LCD display.

5. The user interface of claim 1 wherein the manipulatable member is a depressable trackball.

6. The user interface of claim 1 wherein the manipulatable member maneuvers an indicator appearing on the display.

7. The user interface of claim 3 wherein the data menu is a virtual telephone keypad and the manipulatable member selects data from the virtual telephone keypad to formulate a telephone number on the display.

8. The user interface of claim 3 wherein the data menu is a virtual keyboard having a plurality of virtual keys where each virtual key represents at least one symbol and the manipulatable member selects data from the virtual keyboard to display information.

9. The user interface of claim 7 comprising an incoming telephone call indicator means for indicating the presence of an incoming telephone call.

10. The user interface of claim 7 wherein the manipulatable member selectively activates the virtual function keys to display the telephone number on the display and to initiate operation of the telecommunication device as a telephony device using the displayed telephone number.

11. The user interface of claim 8 wherein the manipulatable member selectively activates the virtual function keys to command the telecommunication device to transmit the displayed information.

12. The user interface of claim 8 comprising an incoming message indicator means for indicating the presence of an incoming message.

13. An ergonomic user interface system for a portable telecommunication device comprising:

a base member having two ends, an inner surface and an outer surface;

a display mounted on the inner surface of the base member for displaying information;

a microphone supported by the base member;

a speaker supported by the base member; and an ergonomic joystick supported by the base member and functionally connected to the display to alter an appearance of the displayed information whereby the user completely operates the device with the ergonomic joystick by selectively activating virtual function keys displayed on the display.

* * * * *